United States Patent

[11] 3,567,915

[72] Inventors Saul Altshuler
Manhattan Beach;
Donald Arnush; Leonard Glatt, Palos
Verdes; Arthur Peskoff, Los Angeles, Calif.
[21] Appl. No. 843,418
[22] Filed July 22, 1969
[45] Patented Mar. 2, 1971
[73] Assignee TRW Inc.,
Redondo Beach, Calif.

[54] METHOD OF AND APPARATUS FOR REMOTELY DETERMINING THE PROFILE OF FLUID TURBULENCE
11 Claims, 10 Drawing Figs.

[52] U.S. Cl. .................................................. 235/151.3, 235/181, 343/5
[51] Int. Cl. ................................................. G01b 15/04
[50] Field of Search ......................................... 356/105–113, 128–130; 235/151.3, 181; 343/5 (W), 5

[56] References Cited
UNITED STATES PATENTS

| | | | |
|---|---|---|---|
| 3,272,974 | 9/1966 | MacCready, Jr. | 235/151.3 |
| 3,360,793 | 12/1967 | Collis | 343/5 |
| 3,404,396 | 10/1968 | Buehler et al. | 343/5 |
| 3,491,358 | 1/1970 | Hicks | 343/5 |
| 3,514,585 | 5/1970 | Norsworthy | 235/181 |

OTHER REFERENCES

" Problems of Clear-Air Turblence: Possible Future Developments," E. R. Reiter: Astronautics & Aeronautics V.5 n8 Aug. 1967; pp.56— 58

Primary Examiner—Malcolm A. Morrison
Assistant Examiner—Edward J. Wise
Attorneys—Daniel T. Anderson, Edwin A. Oser and Jerry A. Dinardo ABSTRACT: Apparatus and a method for remotely determining the profile of fluid turbulence such, for example, as clear-air turbulence. The intensity of an acoustic wave passing through a liquid, such as water, or the intensity of an electromagnetic wave, such as light, passing through air is determined at a plurality of different locations. In the electromagnetic case this may be done by a set of spaced telescopes and photosensitive devices or by optically scanning the density of a previously exposed photographic plate. An electric signal representative of the intensity of the acoustic or electromagnetic wave is then developed, and a second electrical signal is obtained which is representative of the spatial correlation function of the fluctuations of the logarithm of the first electrical signal. Thus, specifically the logarithm of the intensity is taken and the spatial correlation of the fluctuations is derived. Finally, a third signal is derived from the second signal. This third signal is representative of the integro-differential transform of the second signal. This third signal then represents the desired profile of, for example, the clear-air turbulence.

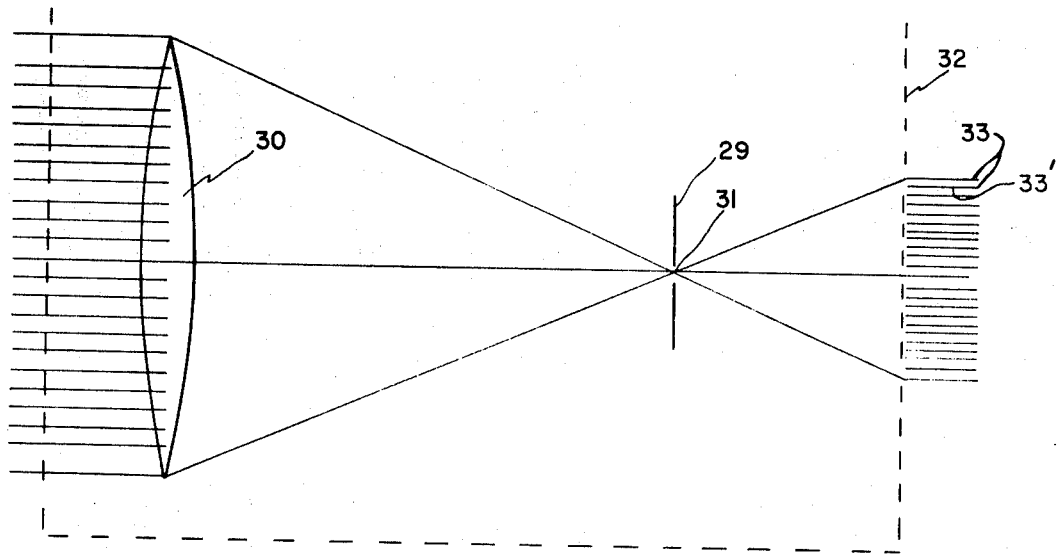
Fig. 2
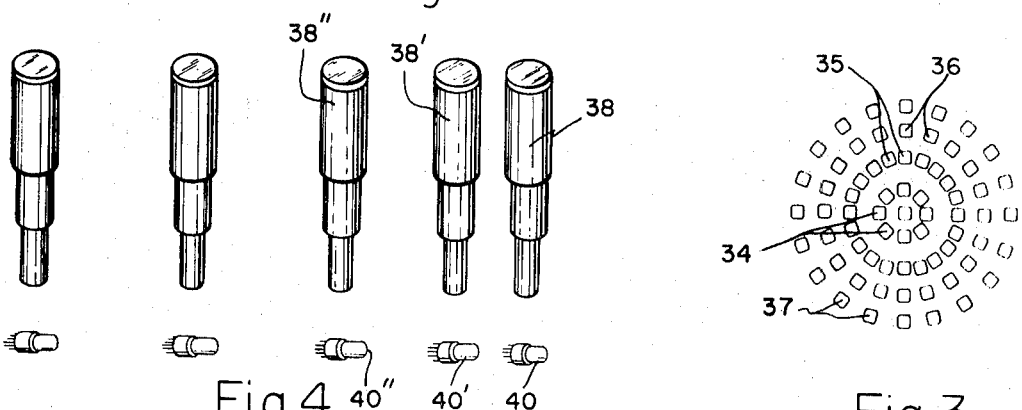
Fig. 4
Fig. 3
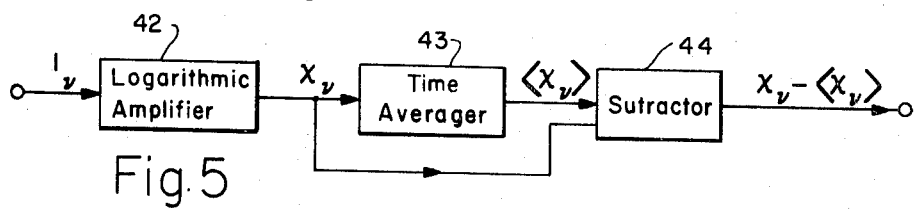
Fig. 5
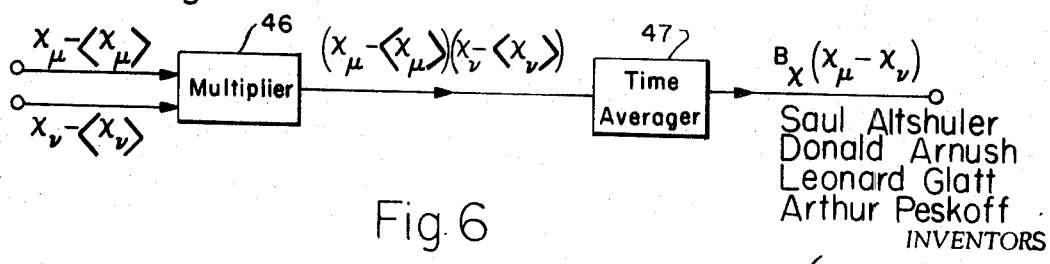
Fig. 6
Saul Altshuler
Donald Arnush
Leonard Glatt
Arthur Peskoff
INVENTORS Saul Altshuler
Donald Arnush
Leonard Glatt
Arthur Peskoff
*INVENTORS*

BY Edwin A. Oser

ATTORNEY

Saul Altshuler
Donald Arnush
Leonard Glatt
Arthur Peskoff
*INVENTORS*

000
3,567,915

METHOD OF AND APPARATUS FOR REMOTELY DETERMINING THE PROFILE OF FLUID TURBULENCE

BACKGROUND OF THE INVENTION

This invention relates generally to a method of, and apparatus for remotely determining the profile of turbulence in a fluid, and particularly relates to apparatus for measuring or determining the clear-air turbulence profile.

Clear-air turbulence is widely recognized as a hazard to aircraft operation. It is known that airplanes which have encountered such clear-air turbulence have been broken up and crashed. This clear-air turbulence is sometimes due to a jet-stream which may cause eddies to form as it passes, for example, over a mountain. However clear-air turbulence may exist near the ground at levels as low as 10 to 100 meters. On the other hand, it has also been observed at heights up to 50,000 or 60,000 feet. Clear-air turbulence has also been recognized as a significant meteorological parameter. In addition, it limits image transmission and laser communication through the atmosphere.

Considerable effort has been expended by the aircraft industry and others to combat the threat of clear-air turbulence. This however requires initially some device to determine the profile of the turbulence of say, the atmosphere. What is really needed is an effective, real-time, hazard warning device for airplanes which will recognize the turbulence and determine its position. However at this time there is no device known capable of determining the strength of the turbulence at remote locations.

It has been suggested to measure the fluctuations of images of stars. It is, of course, well-known that these fluctuations are caused by clear-air turbulence. However up to now, there was no known method or device for determining the actual turbulence profile from these or other measurements.

It is also known that turbulence exists in the ocean. Since sea water does not propagate electromagnetic waves well, it is more feasible to measure turbulence in the ocean by means of an acoustic wave.

It is accordingly an object of the present invention to provide a method of, and apparatus for determining the profile of turbulence in either a gaseous or liquid medium.

Another object of the present invention is to provide a method of, and apparatus for determining the profile of clear-air turbulence by measuring the intensity of an electromagnetic or acoustic wave passing through the medium and subsequently processing the information obtained at spaced locations.

A further object of the present invention is to provide apparatus for and a method of determining the location of clear-air turbulence in the upper atmosphere.

SUMMARY OF THE INVENTION

The mathematical theory upon which the present invention is based has been published by one of the inventors, Arthur Peskoff, in the Journal of the Optical Society of America, volume 58, no. 8, pages 1032 to 1040 of Aug. 1968.

In any case, the apparatus of the present invention permits one to determine remotely the profile of turbulence of a fluid such as water or air. This may be done in the case of water by an acoustic wave or in the case of air by an electromagnetic wave passing through the fluid. Thus when it is desired to measure the clear-air turbulence, use may be made of the light from a star passing through the atmosphere. Alternatively other electromagnetic waves could be used such, for example, a microwaves. These may be generated, for example, by an artificial satellite passing over the atmosphere. Alternatively the artificial satellite might illuminate the ground with a laser beam.

Thus the intensity of such a wave is first sensed at different locations. An electric signal is developed which represents the intensity of the wave. This may be effected by any suitable transducer. For example, in the case of clear-air turbulence a series of telescopes may be set up, each provided with a photomultiplier or photodiode for converting the light intensity into an electric signal representative of different locations. Alternatively a photographic plate may be exposed and developed and subsequently scanned by a photodensitometer to record intensity variations as a function of location.

This first electric signal is then transformed into a second electric signal by means of an analogue or digital computer. The second electric signal is representative of the spatial correlation function of the logarithm of the first electrical signal. The computer then correlates the information obtained at the various locations where measurements were initially made. Finally additional means are provided which may also consist of either an analogue or digital computer. The third means serves the purpose to derive a third electrical signal representative of the integro-differential transform of the second signal. Finally some display means such as a cathode-ray tube may be provided for displaying the third electrical signal. This third signal then represents the desired air-turbulence profile.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 2 is a schematic side-elevational view showing how a wave front may be imaged by a lens to sample light intensities at various locations;

FIG. 3 is an end view of a mosaic of photocells used with the large lens arrangement of FIG. 2 for sampling light intensities at a set of concentric circles;

FIG. 4 is a schematic showing of a set of telescopes and associated photomultipliers for sampling light intensity at various locations;

FIG. 5 is a block diagram of one of the boxes of the system of FIG. 1;

FIG. 6 is a block diagram of another one of the boxes of the system of FIG. 1;

DESCRIPTION OF THE PREFERRED EMBODIMENTS

Figure 1:
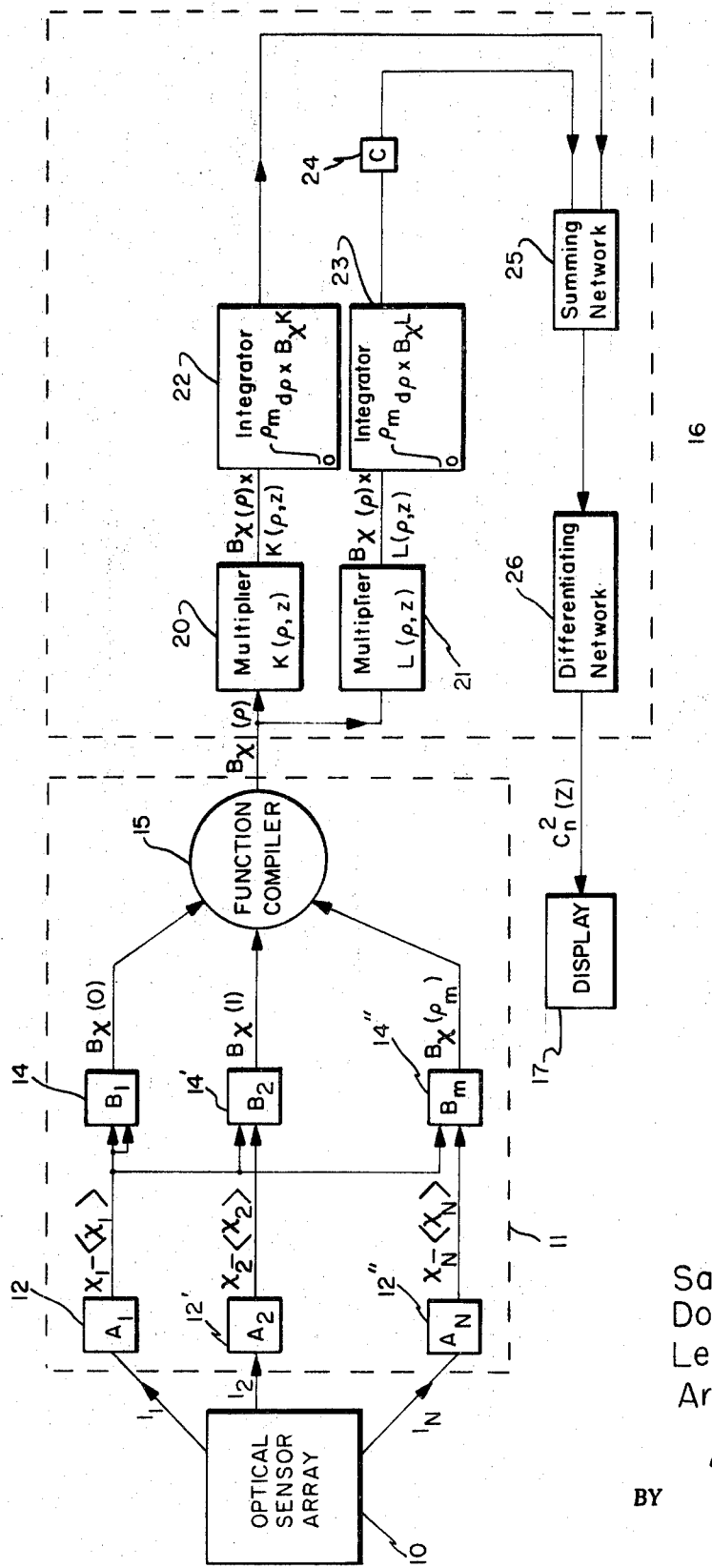
FIG. 1 is a block diagram of a system for determining remotely the turbulence of a fluid in accordance with the present invention.

Referring now to the drawings and particularly to FIG. 1 there is illustrated in block form apparatus in accordance with the present invention. However, before describing the operation of the block diagram of FIG. 1, it will be convenient to set forth the mathematical foundation on which the present invention is based. Essentially it might be stated that any turbulence of a fluid such as clear air, creates random changes in the physical parameters of the air, such as the temperature, density and the index of refraction. The variation of the physical parameters of the medium in turn causes the phase of a wave passing through the medium to change. The intensity variations in the diffraction pattern caused by these phase variations is essentially what is being measured in accordance with the present invention. Thus it may be visualized that an electromagnetic wave with a plane wave front enters the atmosphere. After passing through turbulence, the wave front of the electromagnetic wave no longer is plane because the index of refraction varies in a random manner and consequently, the phase of the wave also varies. After further propagation through the atmosphere, because of diffraction, the phase variations lead to intensity variations.

The present invention is predicated on a mathematical equation for the strength of the turbulence $C_n^2(z)$. In this expression $n$ stands for the index of refraction of the fluid such as air, and $z$ indicates the distance from the observer measured along the line of sight. Accordingly, the following equation is obtained:

$$C_n^2(z) = \frac{d}{dz}\int_0^\infty K(\rho,z)B_x(\rho)d\rho \quad (1)$$

wherein $\rho$ is the separation between a pair of sensors measuring the intensity of the electromagnetic or acoustic wave, and $\kappa(\rho, z)$ is the kernel of the transform given above by formula (1). This, for example, in the special case of atmospheric turbulence which has a so-called Kolmogorov spectrum, is given by $$K(\rho,z) = \frac{8\Gamma\left(\frac{11}{6}\right)k^{-1/6}z^{-11/6}\rho}{\pi\sqrt{3}\Gamma(8/3)} Im\left[e^{i\pi/12}F\left(\frac{11}{6}\bigg|1\bigg|\frac{i\rho^2 k}{4z}\right)\right] \quad (2)$$

In this equation $\Gamma(x)$ is the well-known gamma function. Furthermore $\kappa$ is the wave number of the electromagnetic wave. $Im$ stands for the imaginary part of the quantity enclosed in curly brackets. Furthermore, $F(a|b|w)$ is the confluent hypergeometric function. Finally, $\beta\chi(\rho)$ is the spatial correlation function of the fluctuations of the logarithmic amplitude of the wave. This function $\beta\chi(\rho)$ is defined as follows:

$$B_x(\rho) = \langle[x(\vec{r})-\langle x\rangle][x(\vec{r}+\vec{\rho})-\langle x\rangle]\rangle \quad (3)$$

In this equation $\chi$ is the logarithmic amplitude of the wave, that is, $$\chi = \tfrac{1}{2}\log I, \quad (4)$$ where $I$ is the intensity of the wave. Angular brackets denote an average over time or space (in a plane perpendicular to the original propagation direction of the plane wave). It should be noted from equation (3) that the fluctuation of the logarithmic amplitude of the wave is first determined. Furthermore, in the equation $\vec{r}$ indicates the coordinate in an XY system in the observation plane (perpendicular to the original plane wave's propagation direction). Furthermore, the arrow over the letter indicates a vector quantity.

Equation (1) is exact. However, as a practical matter, it would not be possible to determine $C_n^2(z)$ exactly because one cannot measure $\beta\chi(\rho)$ for values of $\rho$ to infinity. In other words, the correlation measurements practically can only be carried out up to a certain finite separation, for example, of telescopes. Accordingly it may generally be more convenient to use an approximate formula which gives a more accurate value for $\tilde{C}_n^2(z)$, when experimental errors are present in $\beta\chi(\rho)$. Accordingly the following approximate formula is obtained.

$$\tilde{C}_n^2(z) = \frac{d}{dz}\int_0^\infty K(\rho,z)\tilde{B}_x(\rho)d\rho \quad (5)$$

where $$\tilde{B}_x(\rho) = \begin{cases} B_x(\rho) \text{ for } \rho<\rho_m \\ \left(\frac{\rho}{2}\right)^{-7/3}\int_0^\infty dz\int_0^{\rho_m} d\rho' B_x(\rho')L(\rho',z) \text{ for } \rho>\rho_m \end{cases} \quad (6)$$

and where $$L(\rho',z) = \frac{k^{-1/6}z^{-5/6}}{6\pi}\Gamma(7/6)\rho' Im\left\{e^{i\pi/12}F\left(\frac{5}{6}\bigg|1\bigg|\frac{i\rho'^2 k}{4z}\right)\right\} \quad (7)$$

In the above equation the symbol $\tilde{A}$ indicates the approximate value of $A$. Further, in Equation (6) $\rho'$ is an integration variable. $\rho_m$ is a value of $\rho$ corresponding to the outer limit of correlation function which can be measured. In other words, it is assumed that beyond the value $\rho_m$ there is too much noise to obtain a meaningful measurement. Thus the value of $\rho_m$, which is dependent on the turbulence profile and the instrumentation for measuring $\beta\chi(\rho)$, is roughly that value of $\rho$ for which the signal-to-noise ratio of $\beta\chi(\rho)$ is unity.

Having now laid the mathematical foundation of the present invention, reference is made to the block diagram of the system of the invention as shown in FIG. 1. The system includes a first box 10 which represents an optical sensor array. Suitable arrays will be described subsequently in connection with FIGS. 2, 3 and 4. In any case, such an optical sensor array will deliver a plurality of electrical signals indicated as $I_1, I_2,..., I_N$, each of which represents the intensity of the wave at a particular location. There may be a total of N such sensors which generally will be more than the three shown or possible less. Shown within dotted lines 11 is an analogue or digital computer which computes the function $\beta\chi(\rho)$ of equation (3). More specifically, the dotted line 11 includes a plurality of boxes 12, 12',....., 12" which have been identified by $A_1, A_2, ...,A_N$. The nature of each of boxes 12, etc., will be explained subsequently in connection with FIG. 5. However, each of the boxes 12, etc., develops a function $\chi_i - \langle\chi_i\rangle$, etc. This is an electrical signal representative of the fluctuations of the intensity at one particular location.

This signal is now fed into a next set of boxes 14, 14', 14" identified by $B_1, B_2, ...., B_m$. Each of the boxes 14, 14', ...., develops a signal $\beta\chi(0), \beta\chi(1)$, etc., corresponding to the correlation of the fluctuations of the logarithm of the signal between a pair of sensors. The nature of each of the boxes 14, 14', etc., will be subsequently explained in connection with FIG. 6.

The electrical output signals of boxes 14, 14', etc., that is, $\beta\chi(0), \beta\chi(1)$, etc., are fed into a function compiler 15. This may, for example, be considered to be in the nature of a time-multiplexer in which the variable $\rho$ may be converted to a time variable, and the general function $\beta\chi(\rho)$ is developed. This is the spatial correlation function of the previously calculated fluctuations of the logarithm of the initial electrical signals $I_1$, etc. The nature of such a function compiler has been shown by way of example in FIG. 7 to which reference will later be made.

The thus obtained electrical signal corresponding to the function $\beta\chi(\rho)$ is subsequently processed by the equipment shown within the dotted boxes 16. This, in turn, performs the transformation of equations (5) (6) and (7). This, of course, yields the turbulence profile $C_n^2(z)$ as the output of boxes 16 shown in FIG. 1. The final unit of the system of FIG. 1 is a display unit 17, such, for example, as a cathode-ray tube or any other convenient device for displaying or exhibiting the desired function.

Within the dotted box 16 there is provided a multiplier 20 and an alternative multiplier 21. As shown, the multiplier 20 will multiply the function $\beta\chi(\rho)$ with the function $\kappa(\rho,z)$ given in formula (2). By means of the box 21, the $\beta$ function is multiplied by $L(\rho,z)$ in accordance with equation (7). The result of the multiplication by units 20 or 21 respectively, is $\beta\chi(\rho)\kappa(\rho z)$ or $\beta\chi(\rho)L(\rho,z)$, as the case may be.

The multiplier 20 is then followed by an integrator 22, which performs the integration shown, that is $$\int_0^{\rho_m} d\rho B_x(\rho)K(\rho,z)$$

Similarly the multiplier 21 is followed by an integrator 23, which performs the following integration $$\int_0^{\rho_m} d\rho B_x(\rho)L(\rho,z)$$

The integrator 23 is followed by a box 24 labeled C. The nature of the box C has been shown in FIG. 8 to which reference will be made hereinafter. The output of the integrator 22 and of the box 24 is fed into a summing network 25, which sums the two signals obtained from the integrator 22 and the box 24. In other words, the results of the integration, according to equation (5) of the integration in accordance with equation (6) is summed by the summing network 25. The resulting sum is then differentiated again by a differentiating network 26, following the summing network 25. The result is the desired function $C_n^2(z)$, which is fed into the display 17 as previously indicated.

It should be noted that multipliers such as shown at 20 and 21, integrators as shown at 22 and 23, as well as summing networks and differentiating networks such as boxes 25 and 26 are well-known in the art and need not be further described. Such operations could either be performed by well-known analogue or digital computers, thus either a special purpose digital computer could be used or a suitably programmed general purpose computer. The same applies to the equipment subsequently described in connection with FIGS. 5—9.

Referring now to FIG. 2, there is illustrated by way of example a suitable optical sensor array. This may, for example, consist of a relatively large converging lens 30 having a focal point 31 at the small aperture in the otherwise opaque plane 29 which diverges the light, for example, of a single star over a relatively large area. The light may be detected in a plane indicated by the dotted lines 32. Each of the arrows 33, 33′, etc., may feed to a photoelectric device to provide the signals $I_1$, $I_2$, etc., $I_N$.

Alternatively there may be provided a photocell mosaic of the type illustrated in FIG. 3. Thus there may be provided concentric rows of photocells or photocell multipliers as shown at 34, 35, 36 and 37. Each photoelectric device serves the purpose to measure the light intensity or the intensity of an electromagnetic wave at discrete locations and to provide an electric output signal such as $I_1$.

An alternative arrangement is shown in FIG. 4. This illustrates a plurality of telescopes 38, 38′, 38″, etc. These are disposed spaced from each other. For example, they may be disposed with a spacing of 1, 5, 3, 2 and 2 units, as will be subsequently explained in connection with FIG. 7. Each of the telescopes has associated therewith a photocell multiplier such as shown schematically at 40, 40′, 40″, etc.

However, instead of detecting the intensity of the electromagnetic wave as shown in FIGS. 2 to 4, it may also be feasible to photograph, for example, a star or a laser pulse, with the arrangement of FIG. 2 by positioning a photographic plate in the plane 32. After the plate has been developed and fixed it may be scanned by shining a light beam through it using, for example, a photodensitometer, and recording the resulting light intensity.

If it should be desired to measure the turbulence in the ocean, an acoustic wave may be generated in the ocean by a suitable transducer. This may, for example, be a loudspeaker or a piezoelectric crystal. The intensity of the acoustic wave may again be measured with another transducer, such as an array of microphones.

As previously pointed out, the structure of the box 12 identified by $A_1$ is shown in FIG. 5. Accordingly, one of the electric signals, such as $IY$ feeds into a logarithmic amplifier 42. This will yield the signal $\chi Y$. The time-average of this signal is then obtained by the box 43 to obtain the signal $\langle \chi Y \rangle$. The subtractor 44 now subtracts the signal $\chi Y$ from the time-averaged signal $\langle \chi Y \rangle$ to yield as shown $\chi Y - \langle \chi Y \rangle$. This signal in turn feeds into one of the boxes 14 or 14′, etc. of FIG. 1.

The structure of these boxes has been shown by FIG. 6. Thus the two signals $\chi \mu - \langle \chi \mu \rangle$ and $\chi Y - \langle \chi Y \rangle$ feed into a multiplier 46. These two time-averaged and subtracted signals correspond to the initial signals obtained from a pair of sensors. The multiplied signal is shown in FIG. 6 and the time-average thereof is taken by the unit 47 to yield to signal $\beta\chi(x\mu - xY)$. This, of course, corresponds to the term $\beta\chi(0)$, $\beta\chi(1)$, etc., as shown in FIG. 1 and these are the signals which feed into the function compiler 15.

Figure 7:
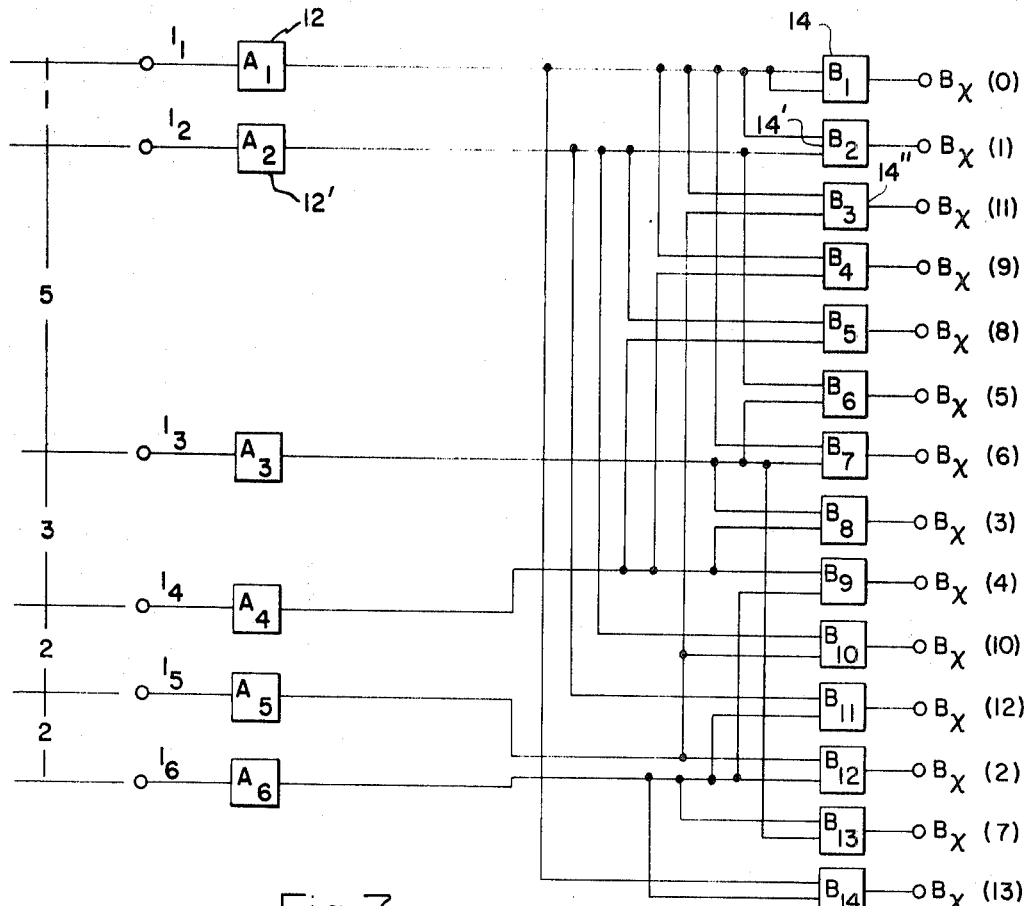
FIG. 7 is a block diagram of the function compiler for correlating the information obtained from various spaced locations.

This function compiler has been shown in FIG. 7 to which reference is now made. As shown here, various signals indicated by $I_1$, $I_2$, etc. are fed into the boxes 12, 12′, etc., identified by $A_1$, $A_2$ through $A_6$. These signals $I_1$, etc., correspond to the light intensities obtained from the optical sensor array 10 arranged in such a way that the distances are as shown in FIG. 7, namely, respectively 1, 5, 3, 2 and 2 units. The output signals of the boxes 12, 12′, etc., are fed in such a way into the next set of boxes 14, 14′, etc. and identified by $B_1$, $B_2$ through $B_{14}$, that altogether 14 signals $\beta\chi(\rho_i)$ are obtained in the manner shown. For example in order to obtain $\beta\chi(0)$ the box 14 is connected only to the box 12, that is, only the light intensity $I_1$ is utilized. However, in order to obtain the next signal $\beta\chi(1)$ the box 14′ must be connected to both boxes 12 and 12′, that is, the light intensities $I_1$ and $I_2$ are utilized. The next signal is $\beta\chi(11)$. This is obtained from the box 14″ identified by $B_3$. Its input is connected to the box identified $A_1$ and the box identified by $A_5$. Accordingly the signal corresponds to 11 units of distance which exist between the signals $I_1$ and $I_5$ composed of units 1, 5, 3 and 2. It will be evident from the above explanation how the remaining signals from $\beta\chi(0)$ through $\beta\chi(13)$ may be readily obtained.

It will be understood that FIG. 7 only shows by way of example how a function compiler may be obtained. It will also be understood that the respective output signals $\beta\chi(0)$, etc. of FIG. 7 may be obtained either simultaneously in time or successively, that is, one after another.

Figure 8:
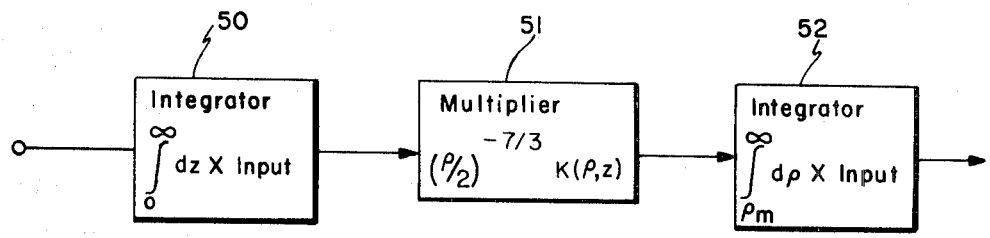
FIG. 8 is a block diagram of another one of the boxes of FIG. 1.

Referring now to FIG. 8, there is illustrated the detailed structure of the box 24, identified by C of FIG. 1. This is one of the integral transform subsystems. Its input is obtained from the integrator 23. The first box 50 is another integrator performing the function indicated, that is, it integrates the input signal from zero to infinity obtained from the integrator 23. The integrator 50 is followed by a multiplier 51. This multiplies the output of the signal obtained from the integrator 50 by $(\rho/2)^{-7/3} \kappa(\rho,z)$, in the range $\rho \geq \rho_m$.

The output of the multiplier 51 is now once more integrated by the integrator 52 to obtain the following signal $\int_{\rho_m}^{\infty} d\rho x$ input, where the input is the output of the operation performed by the block 51. The output of the integrator 52 then feeds into the summing network 25 of FIG. 1. The output of the summing network 25 then feeds into the differentiating network 26 which performs the differentiation with respect to the variable $z$.

Figure 9:
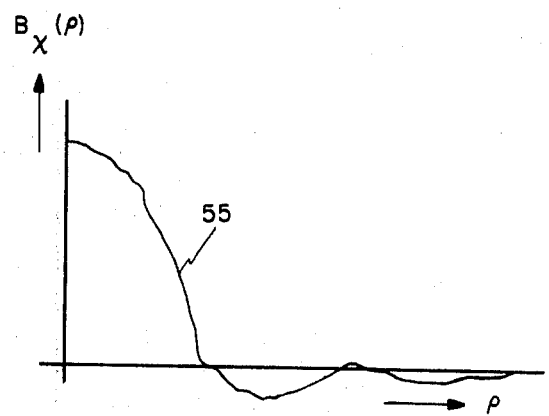
FIG. 9 is a chart of a typical logarithmic amplitude correlation function.

FIG. 9 to which reference is now made shows by way of example a curve 55. This is a typical logarithmic-amplitude correlation function and shows the function $\beta\chi(\rho)$ as a function of $\rho$. It will be noted that for large values of $\rho$ the function $\beta\chi(\rho)$ approaches zero in an oscillatory manner.

Figure 10:
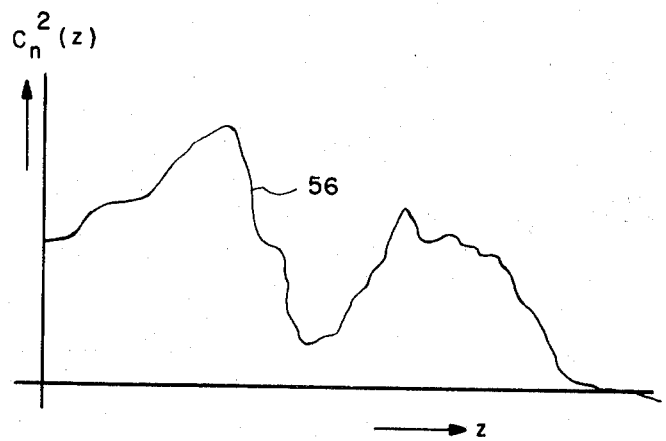
FIG. 10 is a chart of a typical turbulence profile.

A typical turbulence profile is shown by the curve 56 of FIG. 10. Accordingly the function $C_n^2(z)$ is shown as a function of distance, $z$. Due to the increasing noise in the function $\beta\chi(\rho)$ at increasing separations $\rho$, it is not possible to obtain meaningful values for this function for large values of $\rho$.

There has thus been disclosed apparatus and a method for the remote determination of the turbulence of air or liquid. The apparatus is based on the recognition that such a turbulence will cause a random variation of various characteristics of the fluid, such, for example, as the index of refraction for an electromagnetic wave. As a result, the wave which originally had a plane wave front becomes distorted and both intensity and phase of the wave are changed in a manner which permits determination of the profile of the turbulence. This is essentially effected by initially measuring the intensity of the wave at different locations and then taking the spatial correlation function of the fluctuations of the logarithm of the light intensity. Finally the integro-differential transform of the second signal is obtained to derive the desired turbulence profile which may then be displayed by a suitable display means.

We claim:

1. Apparatus for remotely determining the profile of turbulence of a fluid by means of a periodic wave passing through the fluid comprising:

a. first means for sensing the intensity of the periodic wave at different locations and for deriving a first electrical signal representative of the periodic wave intensity at said different locations;
b. second means coupled to said first means for deriving a second electrical signal representative of the spatial correlation function of the fluctuations of the logarithm of said first electrical signal; and
c. third means coupled to said second means for deriving a third electrical signal representative of the second signal, whereby said third signal represents the desired turbulence profile.

2. Apparatus for remotely determining the profile of clear-air turbulence by means of an electromagnetic wave passing through the air comprising:
a. first means for sensing the intensity of the electromagnetic wave at different locations and for deriving a first electrical signal representative of the electromagnetic wave intensity at said different locations;
b. second means coupled to said first means for deriving a second electrical signal representative of the spatial correlation function of the fluctuations of the logarithm of said first electrical signal;
c. third means coupled to said second means for deriving a third electrical signal representative of the integro-differential transform of said second signal; and
d. display means coupled to said third means for displaying said third signal representing the desired air-turbulence profile.

3. Apparatus as defined in claim 2 wherein said first means includes a plurality of telescopes for sensing the intensity of the electromagnetic wave in different locations, and a photoelectric device associated with each of said telescopes for deriving said first electrical signal.

4. Apparatus as defined in claim 2 wherein said first means includes a lens for diverging the electromagnetic wave over an extended area within a predetermined plane, and a plurality of photoelectric devices disposed in said plane for deriving said first electrical signal.

5. Apparatus as defined in claim 2 wherein said second means includes a logarithmic amplifier for deriving a signal representative of the logarithm of said first signal followed by a time-averager and a subtractor for obtaining the fluctuations of the logarithm of said first electrical signal.

6. Apparatus as defined in claim 5 wherein said second means additionally includes a multiplier followed by an additional time-averager for deriving a plurality of signals, each being representative of the fluctuations of the logarithm of said first electrical signal corresponding to a plurality of said different locations, and a function compiler coupled to said additional time-averagers for deriving a composite signal representative of said spatial correlation function.

7. Apparatus as defined in claim 2 wherein said third means includes a multiplier, an integrator, a summing network and a differentiating network for deriving said third signal representative of the integro-differential transform of said second signal.

8. The method of remotely determining the profile of turbulence of fluid by means of a periodic wave passing through the fluid comprising the steps of:
a. sensing the intensity of the periodic wave at a plurality of different locations;
b. deriving a first electrical signal representative of the periodic wave intensity at the different locations;
c. deriving a second electrical signal from the first electrical signal representative of the spatial correlation function of the fluctuations of the logarithm of the first electrical signal; and
d. deriving a third electrical signal from the second electrical signal representative of the integro-differential transform of the second signal, the third signal representing the desired turbulence profile.

9. The method defined in claim 8 including the additional step of displaying the third electrical signal to display the desired turbulence profile.

10. The method of remotely determining the profile of clear-air turbulence by means of an electromagnetic wave passing through the air and comprising the steps of:
a. sensing the intensity of the electromagnetic wave at different locations;
b. deriving a first electrical signal representative of the electromagnetic wave intensity at the different locations;
c. deriving from the first electrical signal a second electrical signal representative of the spatial correlation function of the fluctuations of the logarithm of the first electrical signal;
d. deriving from the second electrical signal a third electrical signal representative of the integro-differential transform of the second signal; and
e. displaying the third electrical signal for displaying the desired clear-air turbulence profile.

11. A method as defined in claim 10 including the additional steps of deriving from the first electrical signal a first auxiliary signal representative of the logarithm of the intensity of the electromagnetic wave at the different locations, deriving from the first auxiliary signal a second auxiliary signal representative of the fluctuations of the logarithm of the first auxiliary electrical signal, and deriving from the second auxiliary signal a third auxiliary signal representative of the spatial correlation function.